United States Patent [19]
Scheuerman

[11] Patent Number: 5,230,461
[45] Date of Patent: Jul. 27, 1993

[54] APPARATUS FOR CONNECTING PIPE SECTIONS

[76] Inventor: Robert Scheuerman, 7257 Richard St., Ft. Lupton, Colo. 80621

[21] Appl. No.: 941,525

[22] Filed: Sep. 8, 1992

[51] Int. Cl.⁵ .................... B23K 9/00; B23K 31/02
[52] U.S. Cl. .................... 228/212; 228/177; 228/44.5; 228/49.3
[58] Field of Search ............ 228/4.1, 154, 212, 177, 228/176, 18, 44.5, 49.3; 285/18; 29/237, 240, 282, 464

[56] References Cited

U.S. PATENT DOCUMENTS

| | | | |
|---|---|---|---|
| 3,710,475 | 1/1973 | Bronstein | 29/240 |
| 4,437,218 | 3/1984 | Pridy | 29/240 |
| 4,907,732 | 3/1990 | Jones | 228/44.5 |
| 5,050,283 | 9/1991 | Piipponen et al. | 29/240 |

FOREIGN PATENT DOCUMENTS

1433726 10/1988 U.S.S.R. ............... 228/49.3

Primary Examiner—Samuel M. Heinrich
Attorney, Agent, or Firm—Dean P. Edmundson

[57] ABSTRACT

Apparatus is described for transporting sections of pipe and connecting them together for laying pipe above ground or in a trench. The apparatus includes a wheeled frame (e.g., a trailer), rotary support for supporting one end of a first pipe section, and an alignment mechanism for supporting the other end of the first pipe section and the leading end of a second pipe section. The first pipe section can be rotated relative to the second pipe section to either connect or disconnect the pipe sections. In another embodiment, apparatus is provided for supporting pipe sections which are to be welded together.

19 Claims, 10 Drawing Sheets

APPARATUS FOR CONNECTING PIPE SECTIONS

FIELD OF THE INVENTION

This invention relates to apparatus and techniques for connecting pipe sections together. More particularly, this invention relates to apparatus and techniques for transporting pipe sections and connecting the sections together for laying on top of the ground or in a trench.

BACKGROUND OF THE INVENTION

Pipe is commonly used for conveying fluids from one location to another. For example, pipe is used for conveying oil, water, or other liquids along the surface of the ground or in a horizontal trench below the surface of the ground. Ordinarily, the pipe sections are threaded at each end such that each pipe section can be threadably connected to the next pipe section.

Although powered apparatus is commonly used for connecting and disconnecting pipe sections used in vertical environments (e.g., oil wells), pipe sections for use in horizontal environments are conventionally connected manually. That is, one threaded pipe section is aligned with another threaded pipe section and then the pipe sections are threaded together by means of manual labor. This is a time-consuming and labor-intensive process. For example, approximately 12-15 minutes may be required to manually connect two sections of threaded pipe together.

Furthermore, the use of manual labor often results in inconsistent pipe joints. In order to prevent leakage of corrosive fluid from the pipeline, each joint must be extremely tight when the pipe is laid. Typically, when using manual labor to install threaded pipe, some of the pipe joints are not tightened to the desired extent. As a result, with the passage of time some of the joints will begin to leak fluid. Because the fluid is often corrosive, it will corrode the joint. Eventually the pipe will leak. Serious contamination of the environment can result, and costly clean-up is then required.

Another disadvantage associated with the use of manual labor to connect threaded pipe together is the risk of personal injury. For example, there is always the risk of back injury when connecting pipe sections together manually.

Pipe sections which are not threaded may be secured together by welding, zaplocking, or fusing (plastic) pipe. The zaplock method uses pipe which has a bell shape on one end. The other end of the pipe has a groove around it. Epoxy is applied to the grooved end of the pipe which is then forced into the bell shaped end of another pipe section to form a joint.

The conventional process for welding sections of pipe together involves laying pipe sections onto timber skids along the intended path of the pipeline. A bulldozer with a sidearm known as a sideboom is then used to cradle the pipe sections in proper position so that they can be welded together. Sometimes the pipe sections are also doped and taped before the welded pipe is lowered into a ditch.

There has not heretofore been provided apparatus for laying pipe having the advantages of the apparatus of the present invention.

SUMMARY OF THE PRESENT INVENTION

In accordance with the present invention there is provided apparatus for transporting sections of pipe and connecting the sections together. The apparatus is also useful for disconnecting threaded pipe sections and then transporting them.

In a preferred embodiment, the apparatus of the invention comprises:

(a) a wheeled frame (e.g., a trailer) which includes forward and rearward ends and an area for supporting the pipe sections for transport;
(b) rotary support means for supporting the first end of a first pipe section and rotating it;
(c) alignment means for supporting the second end of the first pipe section and the first end of a second pipe section in a manner such that (1) the second end of the first pipe section is in contact with the first end of the second pipe section, and (2) the first and second pipe sections are longitudinally aligned.

The rotary support means is adapted to rotate the first pipe section relative to the second pipe section to selectively couple or decouple them.

The apparatus of the invention greatly reduces the amount of manual labor required to connect or disconnect threaded pipe sections. The apparatus also reduces the time required for connecting or disconnecting pipe sections. Furthermore, each threaded pipe joint can be automatically tightened to the desired extent so that the joints will not leak the fluid which is being carried in the pipeline.

Also, using the apparatus of this invention, there is less binding and lifting required by manual laborers. This reduces the possibility of injury to laborers. There is also less damage to the pipe because it is not dropped to the ground from a trailer when it is laid. With less damage to the pipe coating, the environment surrounding the pipe is safer for a longer period of time than is conventionally provided. Because the pipe is less subject to being damaged, the costs associated with repairing or replacing pipelines are reduced.

In another embodiment, the invention provides apparatus and techniques for use in welding pipe sections together. The apparatus comprises, in one embodiment:

(a) a wheeled frame including forward and rearward ends; wherein the frame includes an area for supporting sections of pipe for transport;
(b) an elevatable arm carried by said wheeled frame which is adapted to elevate one end of a first pipe section;
(c) support means adjacent the rearward end of the wheeled frame for supporting the forward end of a second pipe section to be welded to the first pipe section; and
(d) means for aligning the adjacent ends of the first and second pipe sections to be welded together.

The apparatus herein is very useful for transporting sections of pipe and then supporting pipe sections in end-to-end fashion so that they can be welded together. This saves considerable time and is much more convenient and efficient than conventional procedures.

Other advantages of the apparatus of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

In the drawings there is illustrated one embodiment of apparatus 10 of the invention for transporting sections of pipe and connecting them together in end-to-end fashion. The apparatus is also useful when disconnecting pipe sections and transporting them from the field to a desired location.

The apparatus comprises, for example, a trailer having a frame 12 and wheels 14. The upper surface 13 of the trailer is adapted to support several lengths of pipe.

The apparatus preferably includes an arm 16 including one end 16A which is pivotably attached to the trailer. A motor 18 is attached to or carried by the opposite end 16B of arm 16. Preferably the motor is a hydraulic motor which is operably connected to a hydraulic pump or by means of lines 17. The motor means includes an adaptor 20 for gripping and supporting one end of pipe section 100 and rotating the pipe section relative to another pipe section 102. Thus, when the pipe sections include threaded ends, and when pipe section 102 is prevented from rotating, one end of pipe section 100 can be threadably connected to (or disconnected from) one end of pipe section 102.

The apparatus shown herein is very useful, for example, in transporting several sections of pipe and then connecting the pipes together in end-to-end fashion as the trailer is towed in a forward direction. The motor can be adjusted such that it will apply a predetermined amount of torque to pipe section 100 when it is threaded onto pipe section 102. In this manner each threaded joint in the resulting pipe line is the same. In other words, each joint can be tightened to the same degree automatically. This greatly reduces the likelihood that any particular joint will start to leak or will fail. This provides a distinct advantage over manually tightening each joint. It is also much more rapid than manual tightening.

The ends of the two pipe sections 100 and 102 to be connected together are held in proper alignment by means of alignment means 30 supported at the rear of the trailer. The alignment means as illustrated is carried on the end of an arm 28 which is pivotably connected to the rear of the trailer.

The alignment means comprises an arm 32 attached to a pin or shaft 31 which can be slidably received in a tubular receiver 29 at the outer end of arm 28. Carried on the arm 32 is a vice or other means of securing the forward end of pipe section 102. For example, a length of chain 35 may be used to secure the pipe section 102 to arm 32. Other equivalent securement means may also be used. Attached to the rear end of arm 32 are rollers 33 for supporting pipe section 102.

Pivotably attached to the forward end of arm 32 is an arm 40 having a fork or upstanding fingers 42. Arm 40 assists in guiding one end of pipe section 100 toward pipe section 102 and aligning pipe section 100 to pipe section 102 so that the sections can be threaded together.

Figure 1:
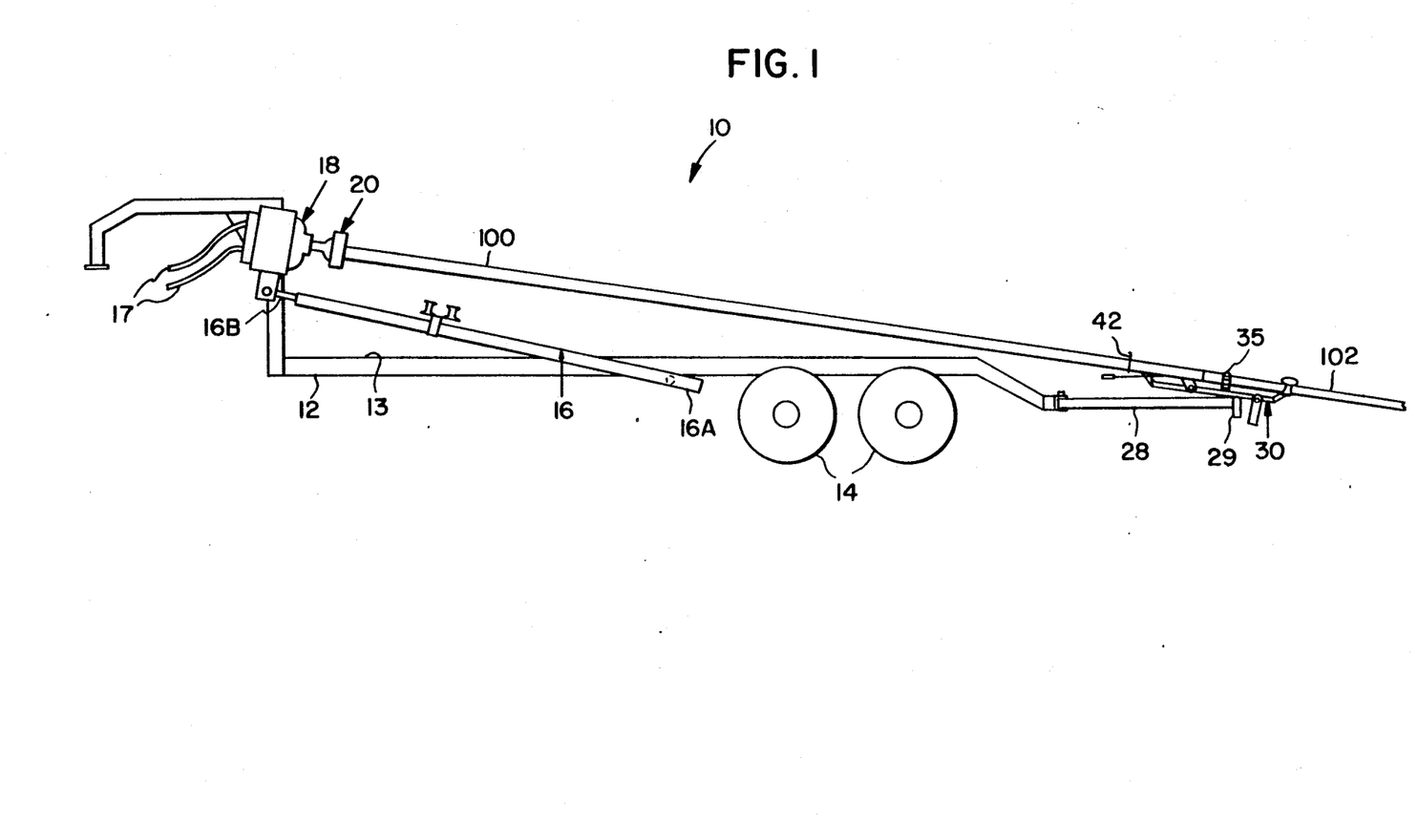
FIG. 1 is a side elevational view of one embodiment of apparatus of the invention.
Figure 2:
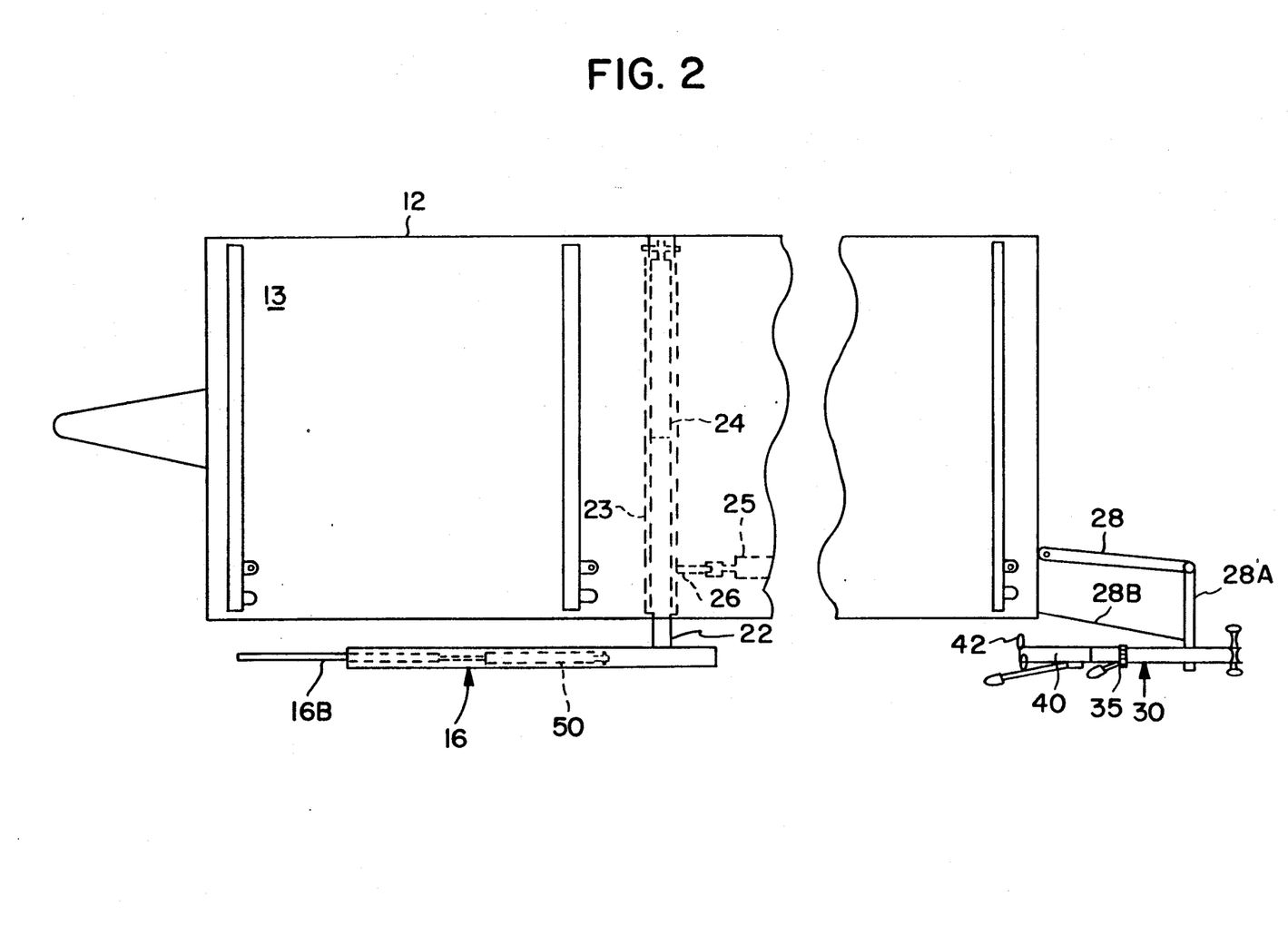
FIG. 2 is a top view of the embodiment of FIG. 1.
Figure 7:
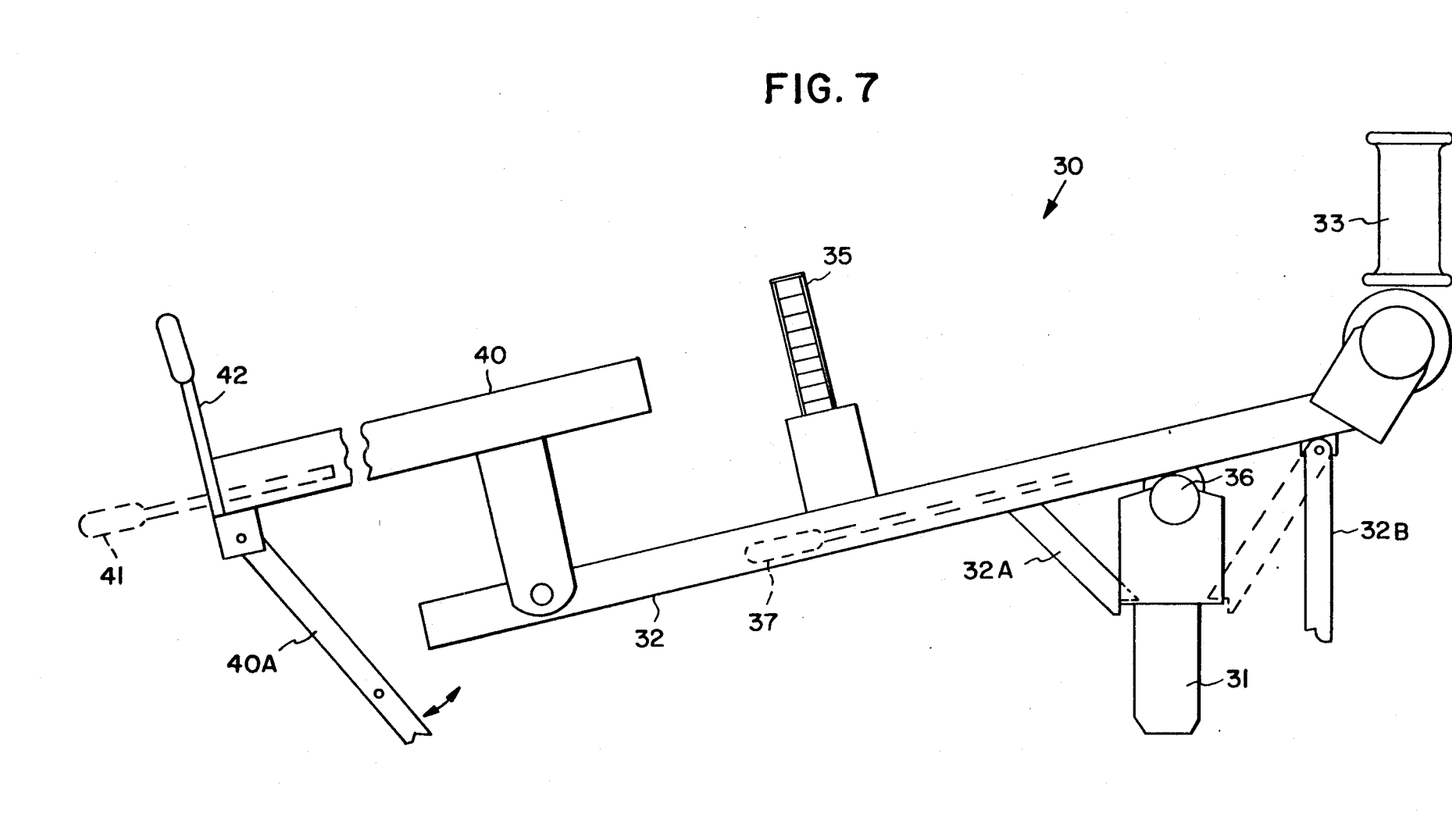
FIG. 7 is a side elevational view of a preferred embodiment of alignment means which is useful in the apparatus of the invention.
Figure 8:
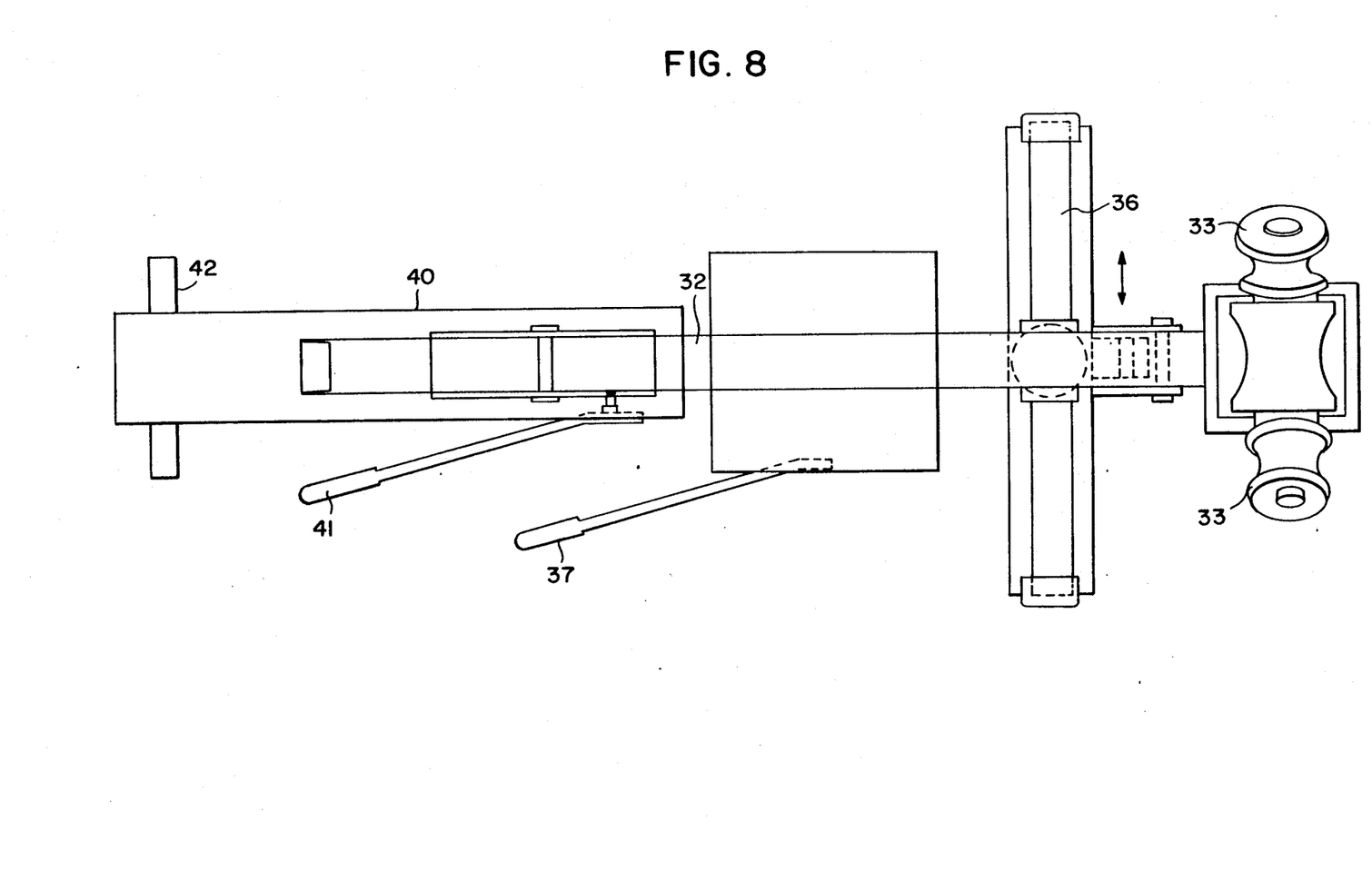
FIG. 8 is a top view of the alignment means shown in FIG. 7.

FIGS. 7 and 8 are side elevational and top views respectively of the alignment means. Arm 32 is pivotable relative to the pin 31, and arm 32 may also be laterally moved on shaft 36 relative to pin 31. Lateral movement of arm 32 facilitates alignment of the ends of the pipe sections to be threaded together. Pin 31 is slidingly received in a tubular receiver 29 (as shown in FIG. 1). Attachment arms 28 and 28A carried by the rear of the trailer support the alignment means, as shown in FIGS. 1 and 2. Arms 28 and 28A are hinged together and rod 28B is detachably connected between the rear of the trailer and the outer end of arm 28A to maintain arms 28 and 28A in proper position.

Attached to arm 32 forwardly of shaft 36 is a stop member 32A which extends downwardly. The stop member 32A is adapted to prevent the forward end of arm 32 from pivoting downwardly beyond a given point. Arm 32B is pivotably attached to the rear end of arm 32 and may be used (in the manner shown in dotted lines in FIG. 7) to maintain forward tilt to arm 32.

The arm 40, which is pivotably connected to the forward end of arm 32, may be secured in a normal upright position by means of pivotable arm 40A resting on the forward end of arm 32. Handle member 41 is secured to arm 40 to facilitate the desired movement of arm 40 to an upward or downward position. Handle 37 on arm 32 is for the purpose of facilitating pivotable movement of arm 32 to a desired upward or downward position.

When arm 32 is pivoted to its upward position (shown in FIG. 1), the alignment means serves to support the rearward end of one pipe section 100 and also the forward end of another pipe section 102 in alignment with each other. The forward end of pipe section 102 is conveniently secured to the arm 32 by means of a vice or clamp 35. Before pipe section 100 is threaded onto pipe section 102, it is sometimes necessary or desirable to wrap section 100 with tape so as to protect the pipe from corrosion in the ground. This can be easily done by rotating section 100 after one end of an adhesive tape roll has been adhered to one end of the pipe section. Then by simply holding the tape roll and moving it along the length of pipe section the tape is drawn onto the pipe. The pipe sections can then be threaded together.

After the two pipe sections have been threaded together, the clamp or vice member 35 may be loosened and arm member 32 may be pivoted downwardly by handle 37 so that the pipe is supported by the rearward end of the alignment means and also by the motor means at the forward end of the trailer. The arm 32B can be latched or otherwise supported on the bracket supporting arm 32 so that the rearward end of arm 32 is maintained in a raised position.

The arm 16 preferably is parallel to the side of the trailer. It is also preferable for the arm 16 to be mounted on shaft 22 which is rotatable and also extensible. For example, shaft 22 may be slidably mounted in tubular sleeve 23 which is carried under the bed of the trailer. A hydraulic cylinder 24 is adapted to push shaft 22 outwardly from the edge of the trailer when desired, and it is also adapted to pull the shaft 22 inwardly again (e.g, for transport).

Figure 4:
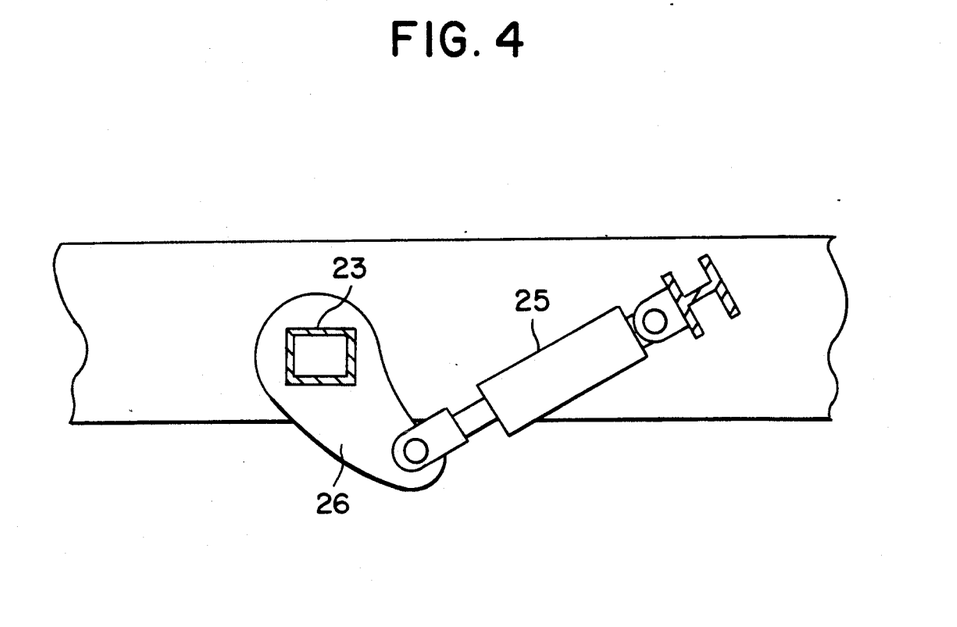
FIG. 4 is a sectional view illustrating the means for elevating the arm.
Figure 5:
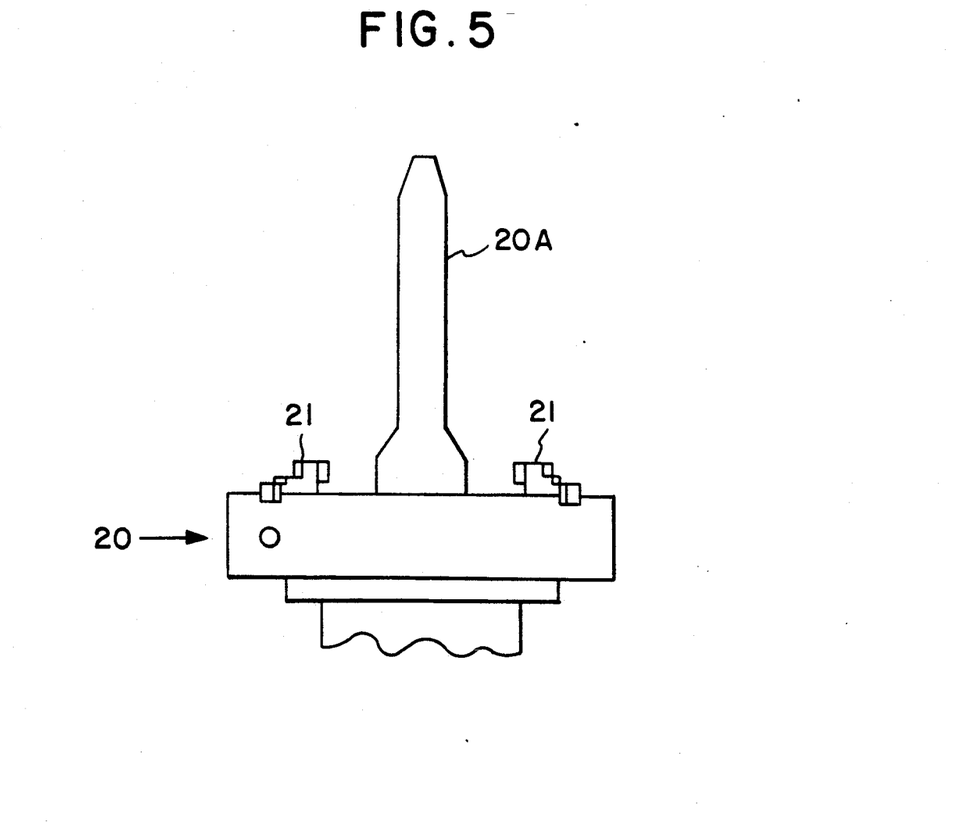
FIG. 5 is a top view of the forward end of the motor for rotating pipe sections.
Figure 6:
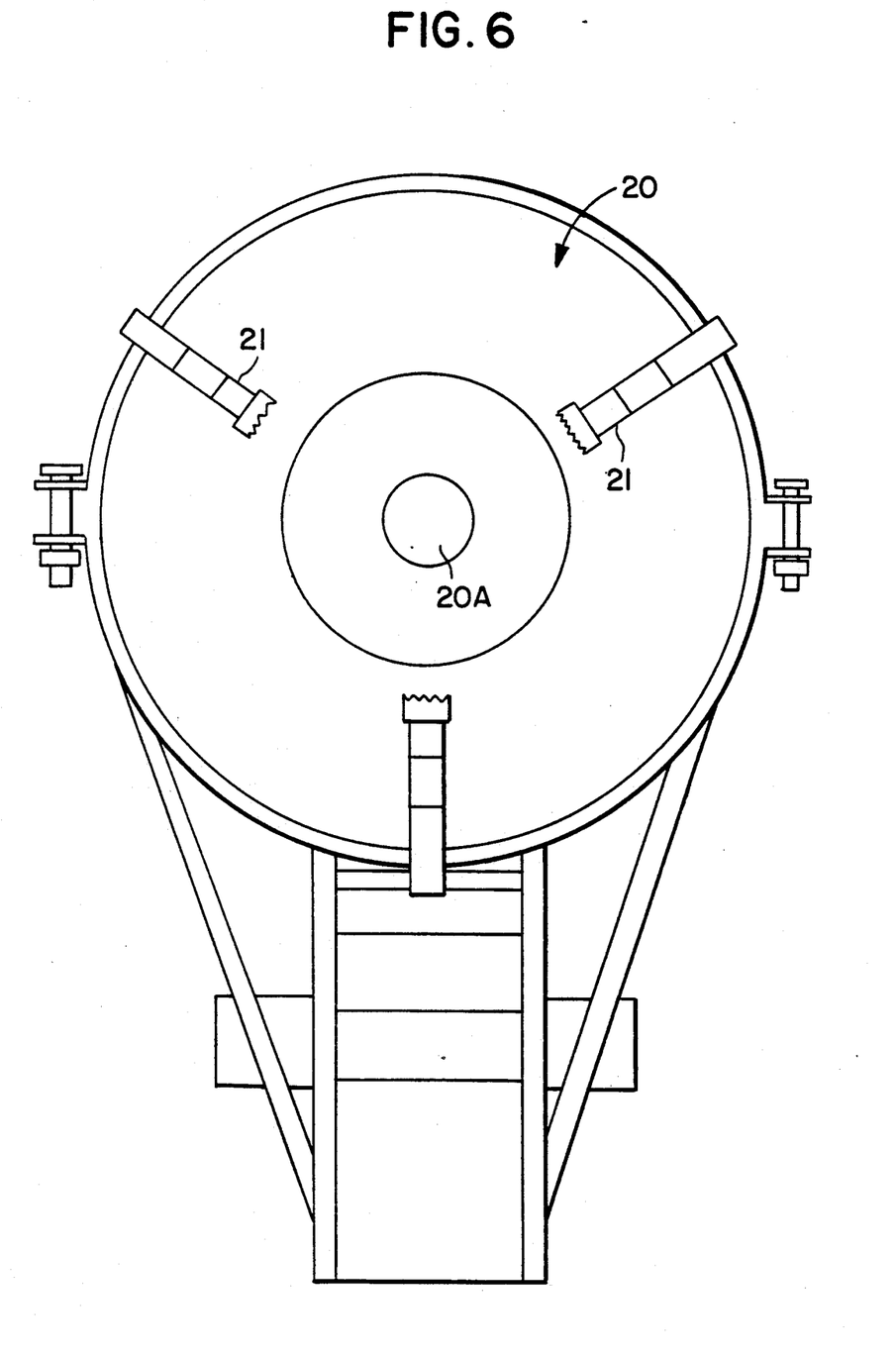
FIG. 6 is a front view of the motor.

Hydraulic cylinder 25 (shown in FIGS. 2 and 4) is adapted to rotate sleeve 23 by means of arm 26. Thus, arm 16 can be caused to pivot upwardly or downwardly relative to the trailer by means of cylinder 25.

Arm 16 is preferably telescoping. For example, end 16B may be slidably received in the main tubular body section. Hydraulic cylinder 50 is connected to section 16B in a manner such that such section can be moved outwardly or retracted as desired.

Figure 3:
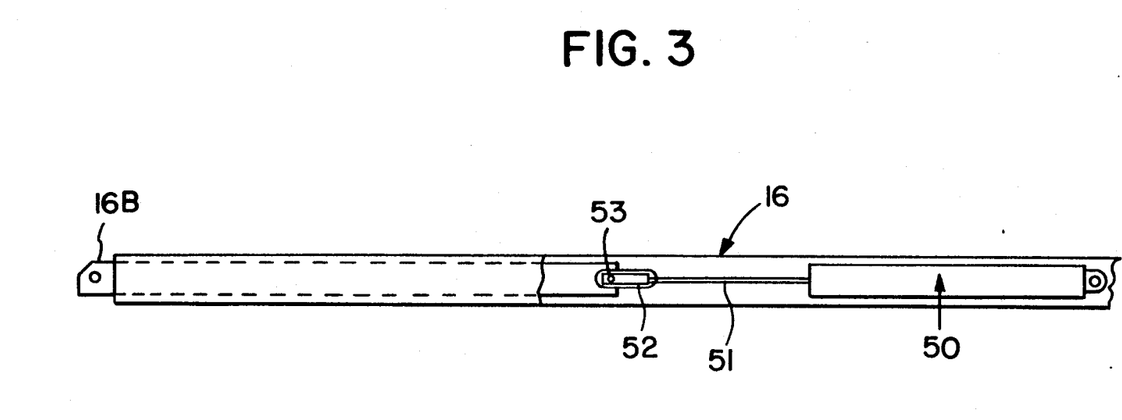
FIG. 3 is a side elevational, partially cut-away, view of the elevatable arm on the embodiment of FIG. 1.

As illustrated in FIG. 3, cylinder 50 includes a ram member 51 having an outer end 52 which includes an elongated slot. A pin 53 passes through the slot and connects to the section 16B. This arrangement enables the section 16B to move slightly (e.g., a few inches) when the motor means on the outer end of section 16B rotates one pipe section in order to thread it onto the fixed end of another pipe section.

Figure 9:
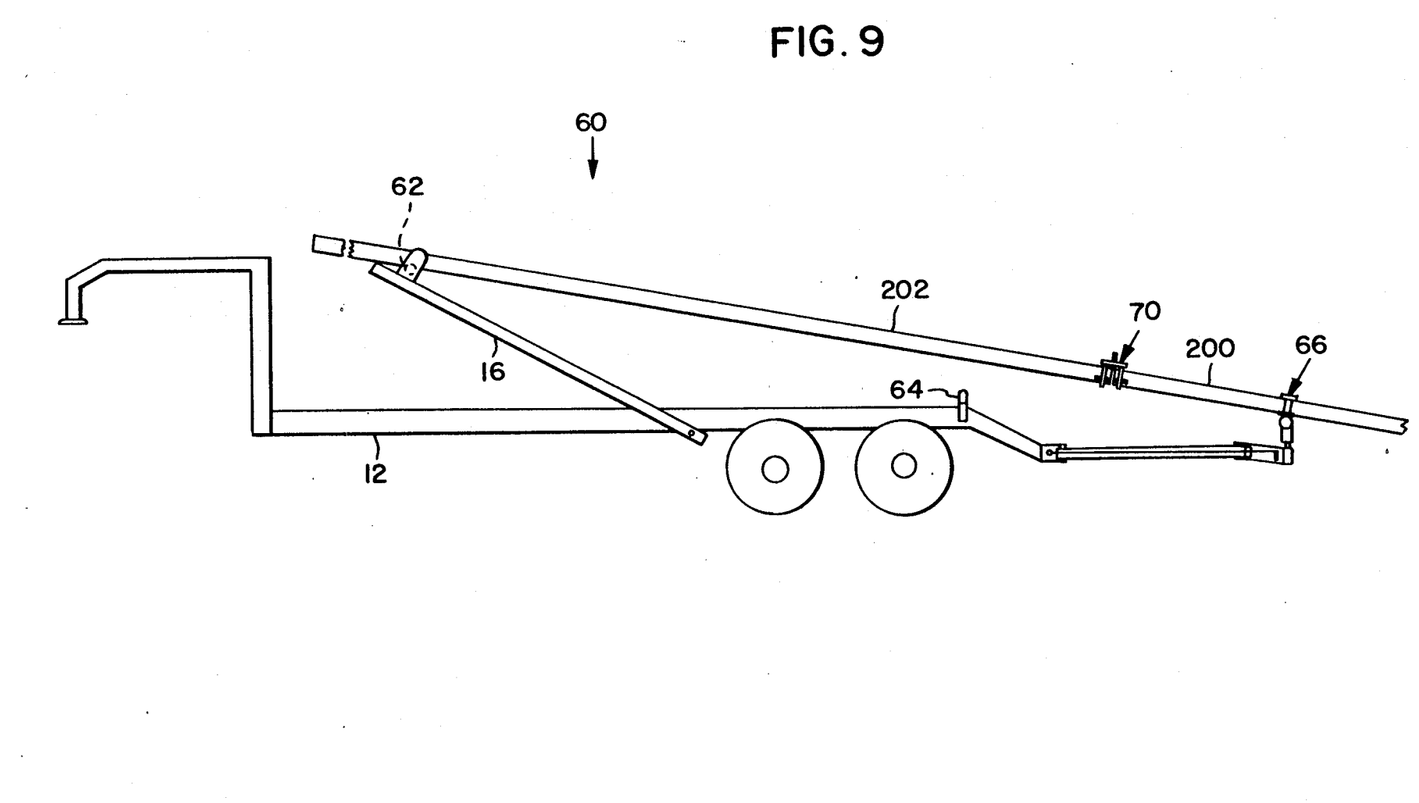
FIG. 9 is a side elevational view of another embodiment of apparatus of the invention.
Figure 10:
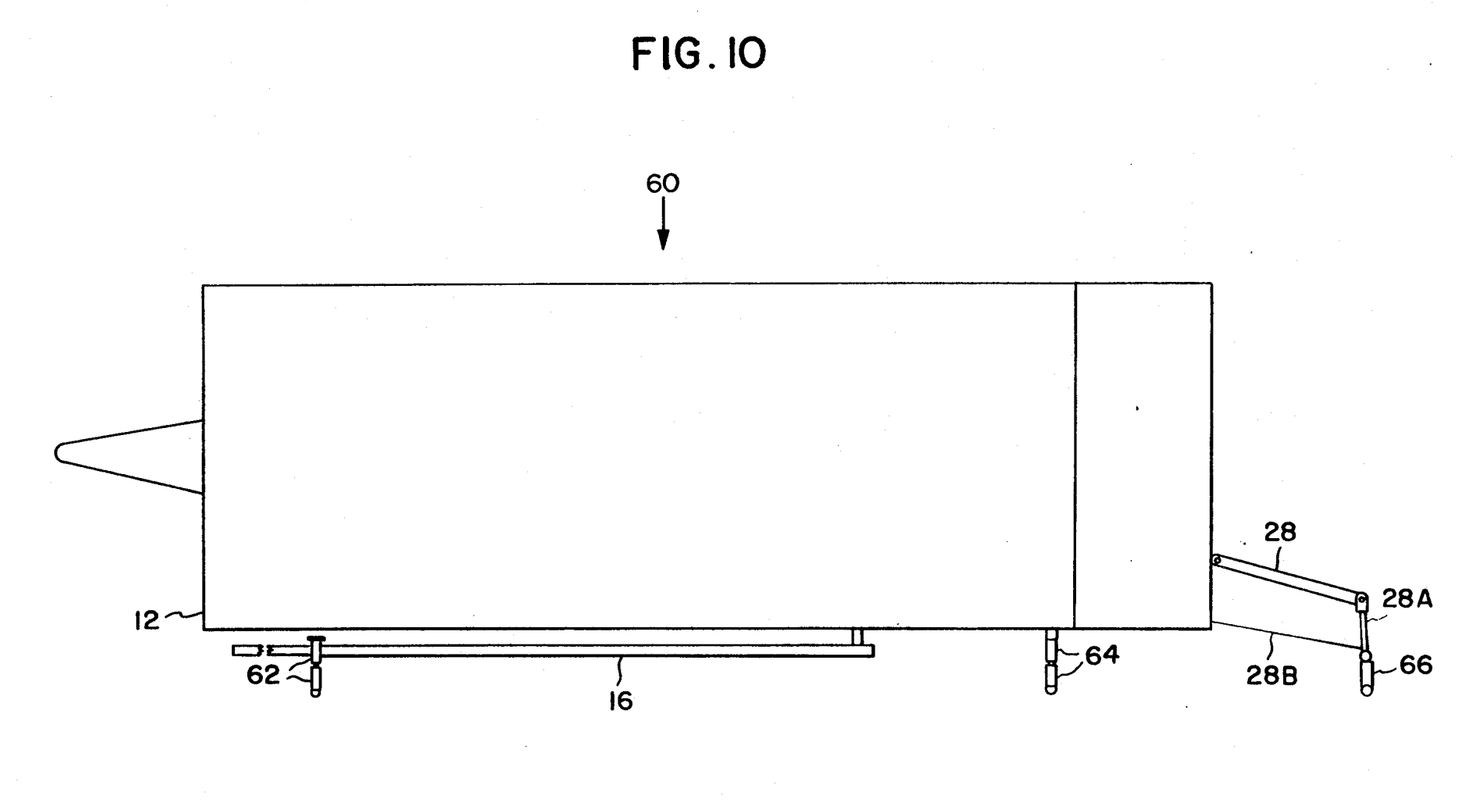
FIG. 10 is a top view of the apparatus of FIG. 9.

In FIGS. 9 and 10 there is illustrated another embodiment of apparatus 60 of the invention which is useful in transporting pipe sections and supporting such pipe sections in end-to-end fashion so that they can be welded together. The apparatus includes a trailer 12 having an arm 16 pivotably mounted on one side of the trailer. Arm 16 is preferably parallel to the side edge of the trailer. Arm 16 may be pivoted upwardly by means of a hydraulic cylinder in the manner described above in connection with FIGS. 2 and 4.

Carried at the forward end of arm 16 are roller means 62. Preferably there are two separate rollers which are axially spaced from each other. At the rear end of the trailer there are additional roller means 64. Again, it is preferred to use two separate rollers which are axially spaced from each other. The roller means 62 and 64 are for the purpose of supporting a pipe section which has been transported on the trailer in preparation for welding the pipe section to another pipe section, as described hereafter.

Mounted rearwardly of the trailer are additional roller means 66. Arms 28 and 28A support these rollers, and rod or brace 28B secures the support arms in proper position.

The apparatus 60 is very useful in transporting pipe sections and then supporting the pipe sections in end-to-end fashion so that they can be welded together. The first pipe section 200 removed from the floor or bed area of the trailer is positioned on rollers 62 and 64 and then moved rearwardly over the rollers so that ultimately the forward end of the pipe is then supported solely by roller means 66.

Then another section 202 of pipe is removed from the trailer and supported on rollers 62 and 64. Section 202 is moved relative to the trailer such that the rearward end of section 202 is in close proximity, but not touching, the forward end of section 200. It is also necessary to longitudinally align sections 200 and 202. Then clamp means 70 is used to temporarily secure the opposing ends of the two pipe sections in proper position to enable them to be welded together. Then the clamp can be removed and the trailer moved forwardly to enable another pipe section to be removed from the trailer bed and welded to the forward end of pipe section 202.

Figure 11:
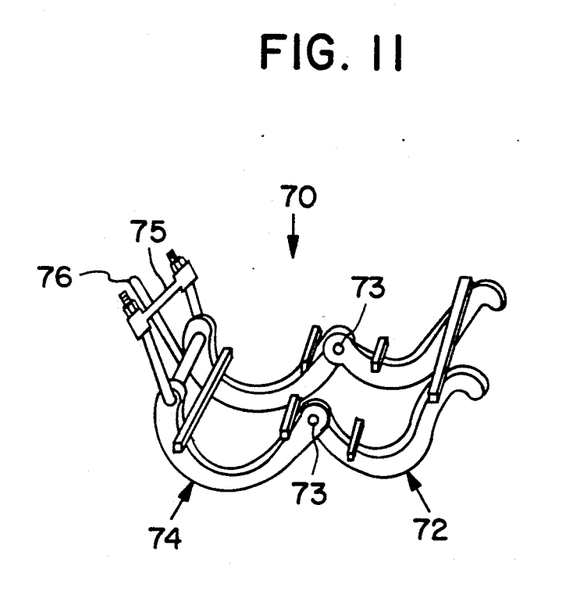
FIG. 11 is a perspective view of a clamp which is useful in holding pipe sections together for welding.
Figure 12:
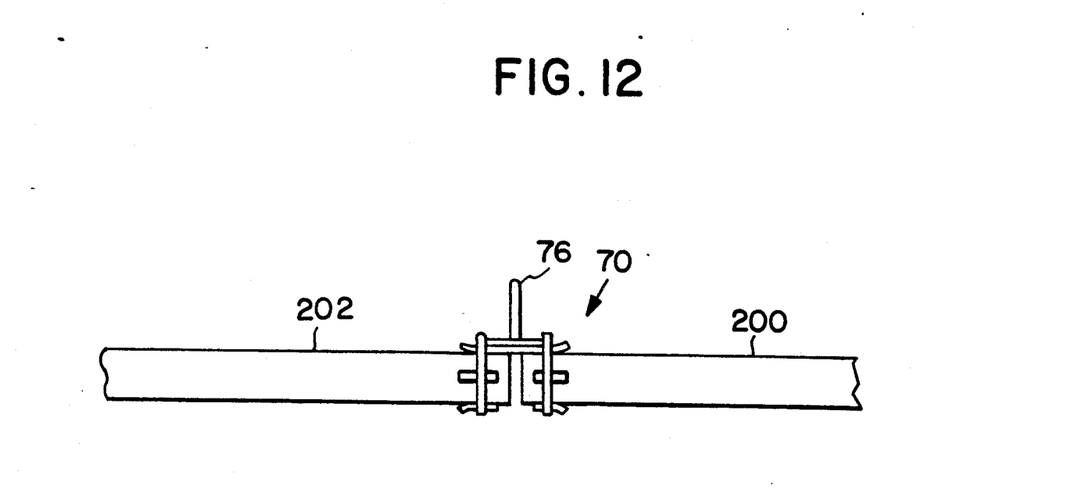
FIG. 12 is a side elevational view showing two sections of pipe held together in preparation for welding.

The preferred clamp means 70 used to hold the opposing ends of the pipe sections to enable welding thereof is commercially available and is illustrated in FIGS. 11 and 12. Preferably the clamp means comprises first and second sections 72 and 74 which are pivotably connected by means of pins or bolts 73. Each clamp section includes spaced-apart support members which are curved (generally semicircular). Cross members are secured to the support members. Some of the cross members do not extend completely across the full span of the support members.

The outer ends of the support members of section 72 are curved downwardly or otherwise include hook portions. Pivotably attached to the outer ends of the support members of section 74 is latch means 75. When the clamp sections 72 and 74 are pivotably closed around the ends of the two pipe sections, the latch means can be pivoted over the outer ends of the hook portions of clamp section 72. Then the clamp is secured by moving handle or lever 76 so as to cause latch means 75 to move against the hook portions. This is accomplished by means of an eccentric mounting between the arms of the latch and the support members of section 74.

The clamp means 70 shown herein enables two pipe sections to be firmly supported in an end-to-end manner with a small gap between them. Then the pipe sections can be spot welded together, after which the clamp can be removed. Then the entire circumference of the joint can be welded.

The apparatus described and illustrated herein is very convenient for transporting pipe sections and enabling the sections to be connected together. The apparatus enables very efficient operation with uniform results.

Other variants are possible without departing from the scope of the invention.

What is claimed is:

1. Apparatus for transporting sections of pipe and connecting said sections together; wherein said sections include first and second threaded ends; wherein said first end of one pipe section is adapted to threadably engage the second end of another said pipe section; wherein said apparatus comprises:
   (a) a wheeled frame including forward and rearward ends; said frame including an area for supporting said sections of pipe for transport;
   (b) rotary support means for supporting the first end of a first pipe section and rotating said pipe section;
   (c) alignment means for supporting the second end of said first pipe section and the first end of a second pipe section in a manner such that (1) said second end of said first pipe section is in contact with said first end of said second pipe section, and (2) said first and second pipe sections are longitudinally aligned;

wherein said rotary support means is adapted to rotate said first pipe section relative to said second pipe section to selectively couple or decouple said pipe sections.

2. Apparatus in accordance with claim 1, wherein said rotary support means comprises hydraulically-powered motor means.

3. Apparatus in accordance with claim 1, wherein said wheeled frame comprises a trailer.

4. Apparatus in accordance with claim 1, further comprising a first elongated arm pivotably mounted to said frame; and wherein said rotary support means is carried on said elongated arm.

5. Apparatus in accordance with claim 5, wherein said first elongated arm is parallel to the longitudinal axis of said frame.

6. Apparatus in accordance with claim 1, wherein said alignment means comprises (a) pipe retention means, and (b) guide means; wherein said retention means is adapted to releasably secure said first end of said second pipe section in a stationary position; and wherein said guide means is adapted to guide said second end of said first pipe section into alignment with said second pipe section.

7. Apparatus in accordance with claim 6, further comprising a second elongated arm pivotably carried by said wheeled frame; and wherein said alignment means is carried by said second elongated arm.

8. Apparatus in accordance with claim 6, wherein said retention means comprises a vice for gripping and retaining said second pipe section.

9. Apparatus in accordance with claim 6, wherein said first elongated arm is telescoping and includes a forward end and a rearward end; and wherein said rotary support means is carried by said forward end of said first arm.

10. Apparatus in accordance with claim 9, further comprising (a) a rotatable shaft carried by said frame, and (b) a cylinder for rotating said shaft; wherein said rearward end of said first arm is secured to said rotatable shaft; wherein rotation of said shaft operates to selectively raise or lower said forward end of said first arm.

11. Apparatus in accordance with claim 10, wherein said rotatable shaft is transverse to the longitudinal axis of said frame; wherein said first arm is perpendicular to said shaft; and wherein said first arm is laterally movable relative to said frame.

12. Apparatus for transporting sections of pipe and connecting said sections together; wherein said sections include first and second threaded ends; wherein said first end of one pipe section is adapted to threadably engage the second end of another said pipe section; wherein said apparatus comprises:
  (a) a wheeled frame including forward and rearward ends; said frame including an area for supporting said sections of pipe for transport;
  (b) a first elongated arm pivotably mounted to said frame; wherein said first arm is parallel to the longitudinal axis of said frame;
  (c) rotary support means carried by said first arm for supporting the first end of a first pipe section and rotating said pipe section;
  (d) alignment means for supporting the second end of said first pipe section and the first end of a second pipe section in a manner such that (1) said second end of said first pipe section is in contact with said first end of said second pipe section, and (2) said first and second pipe sections are longitudinally aligned;

wherein said rotary support means is adapted to rotate said first pipe section relative to said second pipe section to selectively couple or decouple said pipe sections.

13. Apparatus in accordance with claim 12, wherein said rotary support means comprises hydraulically-powered motor means; and wherein said wheeled frame comprises a trailer.

14. Apparatus in accordance with claim 12, wherein said alignment means comprises (a) pipe retention means, and (b) guide means; wherein said retention means is adapted to releasably secure said first end of said second pipe section in a stationary position; and wherein said guide means is adapted to guide said second end of said first pipe section into alignment with said second pipe section.

15. Apparatus in accordance with claim 14, further comprising a second elongated arm pivotably carried by said wheeled frame; and wherein said alignment means is carried by said second elongated arm.

16. Apparatus in accordance with claim 14, wherein said retention means comprises a vice for gripping and retaining said second pipe section.

17. Apparatus in accordance with claim 16, wherein said first elongated arm is telescoping and includes a forward end and a rearward end; and wherein said rotary support means is carried by said forward end of said first arm.

18. Apparatus in accordance with claim 17, wherein said rotatable shaft is transverse to the longitudinal axis of said frame; wherein said first arm is perpendicular to said shaft; and wherein said first arm is laterally movable relative to said frame.

19. A method for transporting sections of pipe and connecting said sections together; wherein said sections include first and second threaded ends; wherein said first end of one pipe section is adapted to threadably engage the second end of another said pipe section; wherein said method comprises the steps of:
  (a) providing a wheeled frame for carrying said sections of pipe;
  (b) attaching rotary support means to said frame for supporting the first end of a first pipe section and rotating said pipe section;
  (c) providing alignment means for supporting the second end of said first pipe section and the first end of a second pipe section in a manner such that (1) said second end of said first pipe section is in contact with said first end of said second pipe section, and (2) said first and second pipe sections are longitudinally aligned;
  (d) supporting said first end of said first pipe section with said rotary support means and aligning said second end of said first pipe section with the first end of said second pipe section; and
  (e) rotating said first pipe section in a manner such that said first and second pipe sections are threadably connected.

* * * * *